Patented Apr. 19, 1949

2,467,550

UNITED STATES PATENT OFFICE 2,467,550

CHLORINATED POLYTHENE COMPOSITIONS

David Adams Fletcher, Pompton Plains, and Robert Scott Taylor, Kearny, N. J., assignors to E. I. du Pont de Nemours & Company, Wilmington, Del., a corporation of Delaware No Drawing. Application July 25, 1946, Serial No. 686,150

12 Claims. (Cl. 260—23)

This invention relates to chlorinated polythene compositions. The polymers of ethylene which are solids at normal temperatures, are disclosed and claimed in Fawcett et al. U. S. Patent 2,153,553 and are now known as polythene. Chlorinated polythene is known in the prior art and the preparation of this product is disclosed in Fawcett U. S. Patent 2,183,556 and in application Serial No. 686,149, filed July 25, 1946, in the name of Robert S. Taylor and entitled "Aqueous suspension chlorination of polythene." Usually these chlorinated polythenes are prepared by chlorinating polythene having a molecular weight above 2000.

When unmodified chlorinated polythene is extruded or otherwise processed at elevated temperatures, various difficulties are encountered. First of all, the unmodified chlorinated polythene undergoes decomposition at the processing temperatures with the release of appreciable amounts of hydrogen chloride accompanied by a marked darkening of the polymer and the formation of bubbles through the evolution of gases. This instability of the polymer may be overcome by proper stabilization. However, despite the fact that a suitable stabilizer is added to the polymer, it is still difficult to extrude said polymer at a satisfactory rate in commercial machines to produce articles having a smooth surface free from undulations, blow holes and other imperfections.

An object of this invention is to provide new compositions comprising chlorinated polythene. It is a further object to provide chlorinated polythene compositions which are satisfactorily stabilized and may also be molded or extruded to form flexible, thermally stable sheeting. A still further object is to provide compositions which are highly useful for the preparation of synthetic insulation which may be extruded at high rates to yield wire coatings which are heat stable, have a smooth surface and have satisfactory electrical properties, without the necessity of using plasticator which have a tendency to migrate from the insulation and result in electrical failures in coated wires and cables. Other objects will be apparent from the description of the invention given hereinafter.

The above objects are accomplished according to the present invention by incorporating with chlorinated polythene, as a combined stabilizer and lubricant therefor, a mixture of litharge and a hydrocarbon wax consisting of at least 50%, by weight, of a microcrystalline hydrocarbon wax. The addition of a small proportion of a metal salt of a long chain fatty acid other than an iron salt materially improves the properties of the composition as will be more fully described hereinafter.

More particularly, it is preferred to employ chlorinated polythene containing 25%–35% chlorine, specifically 27%–30%, and, as the combined stabilizer and lubricant, a mixture of 0.25%–4.0%, by weight of the chlorinated polythene, of litharge, 1.0%–15.0% and, specifically, 3.0%–6.0%, of a microcrystalline hydrocarbon wax, and 0.25%–4.0% of a metal salt of a fatty acid having from 16 to 20 carbon atoms, inclusive, other than an iron salt.

The invention further comprises forming the composition into a finished shape by extrusion, injection or compression molding, or the like and then baking the formed composition to a point where it is 50% or more insoluble in boiling trichloroethylene. The resulting baked product is not tacky nor will it melt at 400° F. Where it is specifically desired to bake the formed composition, the proportion of litharge may be increased radically over 4.0% by weight of the chlorinated polythene as the increased proportion of litharge permits attaining a desired degree of insolubility of the composition with a shorter or milder baking.

The method of mixing the components in the present invention is not, broadly, critical providing that the mixing gives a substantially uniform composition. Nevertheless, it has been discovered that mixing on heated rolls or in a Banbury mixer for sufficient time normally to obtain uniform batches gives a composition which, when subsequently extruded in commercial machines at high extrusion rates, tends to give products which are either rough or non-uniform in thickness while smooth extrusions are possible surprisingly enough when the same composition is worked in a plasticator such as the Farrel-Birmingham plasticator disclosed on page 21 of the April 1946 issue of "Plastics World." Preferably, the components are worked in a plasticator to give a uniform plastic composition after which the composition is usually removed and cut in a Ball and Jewell cutter, or the like, into molding powder of the desired granular size. The resulting molding powder is particularly adapted to be fed to commercial extruders or injection or compression molding machines.

The following examples in which all parts are by weight unless otherwise specified, illustrate specific embodiments of the invention and in the case of Examples VIII, IX, and X specific departures from the invention.

Example I 95 parts of chlorinated polythene (27% chlorine), 5 parts of a blend of 55% microcrystalline hydrocarbon wax and 45% paraffin, and 1 part of litharge (PbO) were passed through a plasticator having a screw diameter of three inches at 300° F. to give a homogeneous blend. The batch was then reduced to a molding powder in a Ball and Jewell cutter and the molding powder fed to No. 1 Royle extruder and the material extruded over wire at a take-off speed of 75 feet per minute with the extruder barrel and head held at a temperature of 320°–340° F. The surface coating on the wire was flexible, smooth, and showed no sign of decomposition or darkening of the coating.

In Examples II, III, IV and V are given compositions which were mixed and extruded as in Example I with the result in each instance that the coating on the wire was smooth and exhibited satisfactory stability in that there was no sign of decomposition or darkening.

Example II

The following composition was used:

| | Parts |
|---|---|
| Chlorinated polythene (33% chlorine) | 95 |
| Blend of waxes as in Example I | 5 |
| Litharge | 1 |

Example III

| | Parts |
|---|---|
| Chlorinated polythene (27% chlorine) | 85 |
| Blend of waxes as in Example I | 15 |
| Litharge | 1 |

Example IV

| | Parts |
|---|---|
| Chlorinated polythene (27% chlorine) | 277 |
| "Be Square" wax (160° F.) | 22 |
| Litharge | 4 |

The "Be Square" wax is a commercially available microcrystalline hydrocarbon wax having a melting point of about 160° F.

Example V

| | Parts |
|---|---|
| Chlorinated polythene (27% chlorine) | 95 |
| Blend of waxes as in Example I | 5 |
| Litharge | 2 |
| Lead stearate | 0.5 |

Example VI

The same composition as that set forth in Example V was used but the composition was mixed at 250° F. on heated rolls for 15 minutes rather than being passed through a plasticator. The extruded coating on the wire exhibited satisfactory stability but the coating was not as smooth as that in Example V.

Example VII

The following composition was worked up as a molding powder and extruded as in Example I:

| | Parts |
|---|---|
| Chlorinated polythene (27% chlorine) | 90 |
| "Be Square" wax (185° F.) | 10 |
| Litharge | 1 |
| Zinc stearate | 1 |

The wax in this example was similar to that used in Example IV except that it had a melting point of about 185° F. The coating obtained in this case exhibited satisfactory stability and was fairly smooth.

The following three examples illustrate results obtained by certain deliberate departures from the present invention. In each case the composition was compounded and extruded on wire as in Example I.

Example VIII

The following composition was used:

| | Parts |
|---|---|
| Chlorinated polythene (27% chlorine) | 96 |
| Lead stearate | 4 |

The lead stearate exhibited a definite stabilizing effect so that the coating on the wire was not objectionable for that reason but the coating was rough and not acceptable for most purposes.

Example IX

| | Parts |
|---|---|
| Chlorinated polythene (27% chlorine) | 100 |
| Litharge | 2 |
| Lead stearate | 0.5 |

The coating obtained here was similar to that obtained in Example VIII, both coatings being rough which apparently is attributable to the absence of the wax from the compositions of these two examples.

Example X

The following composition was used:

| | Parts |
|---|---|
| Chlorinated polythene (27% chlorine) | 95 |
| Blend of waxes as in Example I | 5 |

In this example there was no component in the composition tending to stabilize it and the lack of stabilization was immediately apparent in that the surface of the coated wire was bubbled and, in addition, the coating had darkened very definitely.

Example XI

The composition of Example V was mixed in a Banbury mixer at 250° F. for 12 minutes and then the mass was reduced to small particles in a Ball and Jewell cutter. The resulting molding powder was extruded at 340° F. into a thin flexible sheet 4 inches wide and having a thickness of 5 mils. There was no indication of decomposition at the high extrusion temperature used.

Example XII 950 parts of chlorinated polythene (27% chlorine), 50 parts of a blend of waxes consisting of approximately 55% of microcrystalline hydrocarbon wax and 45% of paraffin, and 20 parts of litharge were mixed as described in Example I and thereafter reduced to a molding powder in a Ball and Jewell cutter. The molding powder was fed to a No. 1 Royle extruder and the material extruded over wire to give a smooth surfaced coating. The head and barrel temperature of the extruder was maintained at approximately 300° F. The coated wire was heated in an air oven for four hours at 338° F. The heat treated coated wire was found to be 58.6% by weight insoluble in boiling trichloroethylene after a sixteen hour extraction, and the insulation did not melt and did not stick after heating on a hot plate at 392° F. for 1 minute. A control sample of the same composition extruded on wire but not given any subsequent heat treatment was completely soluble in the sixteen hour boiling trichloroethylene extraction. Furthermore, the unheat-treated control sample melted and immediately adhered to a hot plate maintained at 392° F. for 1 minute.

It will be understood that the foregoing examples are merely illustrative and that the invention broadly comprises chlorinated polythene compositions containing, as a combined stabilizer and lubricant therefor, a mixture of litharge and a hydrocarbon wax, the wax consisting of at least 50% of a microcrystalline hydrocarbon wax.

The invention is applicable to chlorinated polythenes in general but to obtain a product of good flexibility chlorinated polythene containing 25% to 35%, by weight, of chlorine is preferred. Specifically, a chlorine content of 27% to 30% is desirable in most cases.

An important feature of the present invention resides in the use of the combination of litharge and a hydrocarbon wax. The examples show and prolonged experimental work confirms the fact that this combination is outstandingly and peculiarly effective in providing a chlorinated polythene that can be molded and extruded satisfactorily, particularly, when the components of the composition are uniformly blended by being subjected to the vigorous and thorough working afforded by a plasticator. While other substances tend to exert a stabilizing and/or a lubricating effect on chlorinated polythene, this particular combination is uniquely effective, this being most readily apparent when the composition is used in present day high-speed extrusion operations.

Other basic lead compounds such as red lead ($b_3O_4$), lead carbonate, basic lead carbonate, and lead stearate do have a stabilizing effect on chlorinated polythene, and lead stearate, when used alone, also functions to some extent as a lubricant, but litharge is considerably more effective as a stabilizer. Further, it is due to the litharge that the compositions of the invention may be considerably improved by baking. The proportion of litharge will usually be relatively small and, preferably, between 0.25% and 4.0%, by weight of the chlorinated polythene. However, the use of a larger proportion of litharge is not harmful although an amount above 4% does not increase the stability sufficiently further to be practical to use such proportion for that purpose. On the other hand, because of the insolubilizing effect of the litharge on the chlorinated polythene on baking, the use of greatly increased amounts of litharge, even up to 25% and 50% of the chlorinated polythene, may be advantageous in certain uses.

The addition of small proportions of lubricants greatly aids the extrusion of chlorinated polythene at the rapid rates presently employed. Numerous lubricants such as paraffin, stearyl alcohol, mixtures of straight chain alcohols having from 12 to 18 carbon atoms, and light process oil, all facilitate extrusion of chlorinated polythene but the microcrystalline hydrocarbon waxes are outstandingly better than other lubricants. It has been discovered that a hydrocarbon wax at least 50% of which consists of a microcrystalline hydro-carbon wax, may be used substantially as successfully as a 100% microcrystalline wax. It is immaterial whether the wax used is a single wax or a blend of several waxes, a blend of 55% microcrystalline hydrocarbon wax with 45% paraffin having been used with great success as shown in the examples.

Microcrystalline hydrocarbon waxes are readily available on the market under various trade names such as "Be Square" wax of various melting points, "Petrosene B" and "Super-Gem" wax. The melting points of these waxes cover an appreciable range but the selection of a wax of a particular melting point is not a primary consideration in the present invention. Usually, a wax having a melting point above 140° F. would be used and there is a slight preference for using a wax having a melting point between 150° F. and 200° F.

The proportion of wax may be varied considerably but usually it will be from 1% to 15% by weight of the chlorinated polythene since less than 1% affects the extrusion properties of the composition unimportantly while quantities much above 15% cause poorer low temperature toughness in the resulting composition without additional improvement in surface gloss or smoothness of products made therefrom. It is preferred to use between 3% and 6% of the wax. For use in the special application of electrical waxes, the proportion of microcrystalline hydrocarbon wax may be increased to as much as 50% by weight of the chlorinated polythene although in most uses there would be no object gained in using such a large proportion of wax.

The addition of a salt of a long chain fatty acid to the composition is not essential but it is advantageous in improving the extrusion characteristics of the composition and, hence, it is preferred to add such a salt where the composition is to be used in an extrusion operation. In practically all cases a proportion of 0.25% to 4.0%, by weight of the chlorinated polythene, of a metal salt will be satisfactory. It is preferred to use metal salts of the long chain fatty acids having from 16 to 20 carbon atoms, inclusive, other than iron salts which are excluded because of the fact that these iron salts cause rather rapid and extensive decomposition of the chlorinated polythene; they are apparently unique among the metal salts in this respect. Excluding the iron salts, the metal stearates including the metal hydroxy stearates are preferred but salts of palmitic, margaric, oleic and other saturated and unsaturated long chain fatty acids are satisfactory. Among the specific preferred salts may be mentioned zinc stearate, lead stearate, magnesium stearate, calcium stearate, sodium and potassium stearates, aluminum palmitate, aluminum mono-, di- and tri-stearates, aluminum dihydroxy stearate and zinc oleate. However, the alkali and alkaline earth metal salts of these acids in general are suitable as well as the various lead, zinc and aluminum salts of these acids.

The compositions of the present invention essentially consist of chlorinated polythene, a hydrocarbon wax, litharge and, preferably, a metal salt of a long chain fatty acid. However, small amounts of other materials are not excluded. Such other materials include fillers such as calcium carbonate, pigments for producing colored compositions and other synthetic and natural resins to modify the properties of the composition for a particular application. These additional ingredients will usually be incorporated in small proportions at the same time that the main components are being mixed such as by rolling on a mill, mixing in a Banbury or plasticator or, if desired, by solvent mixing with subsequent evaporation of the solvent.

The compositions of this invention are particularly adaptable to the production of insulated wires and cables wherein the extrusion may be carried out at a commercially feasible rate without decomposition of the resin to produce smooth coatings at extrusion temperatures in the neighborhood of 350° F. or even higher. One particular advantage of the compositions is the fact that the resin is stabilized with non-volatile stabilizers and that the compositions may be mixed and extruded at elevated temperatures and held at these temperatures for longer periods of time than similar chlorinated polythene compositions stabilized with various organic stabilizers, because of the fact that the stabilizers which are completely organic in nature, have a higher volatility. The combination of a hydrocarbon wax with litharge incorporated in chlorinated polythene may be used to improve the surface gloss of injection molded articles as well as extruded products. These compositions are of particular merit in the electrical insulating field because they may be used to coat various types of electrical parts to serve jointly as a water-proofing jacket, as a mechanical protection and as an electrical insulation. Examples of this are coating the exterior of electrical capacitors or forming a case surrounding an electrical capacitor, coating the exterior of resistors, coating the exterior of wound coils and coating a paper insulated or cotton braid jacketed wire, and other similar items.

These chlorinated polythene compositions make a definitely superior coating compound in the above applications because of the fact that they are less flammable than polystyrene; they have better resistance to mechanical abrasion than the usual electrical waxes; and they do not tend to become brittle and crack from their own contraction when cooled to below minus 40° F.

The instant compositions may also be extruded or calendered into sheeting which can be used as an insulating film in electrical capacitors, as a wrapping tape on bare or insulated wires or cables, as a wrapping tape on motor winding coils, relay coils, and other similar applications. These compositions contain no plasticizer and hence do not become brittle on ageing. Furthermore, the chlorinated polythene sheeting elongates and contracts sufficiently to make a good wrapping tape. Polystyrene, a competitive material, can be satisfactorily made without a plasticizer but has insufficient elongation to serve as a good tape. Furthermore, the impact properties of the chlorinated polythene compositions are better and the solvent resistance is satisfactory towards paraffinic solvents.

Another important use for these compositions is in the wire covering field either as primary insulation or as a jacket extruded directly over primary insulation, over a braided insulation, or extruded as a tube and later slipped over the primary insulation. These applications as wire and cable primary insulation and jacketing material constitute a major improvement over the flexible thermoplastic materials previously used (e. g. vinyl halide polymers and copolymers) since no plasticizer is necessary to obtain the desired flexibility. Hence there is no plasticizer loss with accompanied embrittlement of the insulation. Furthermore, when using these compositions as a jacket over low loss primary insulation (e. g. polythene), there is no bleeding or migration of plasticizer into the primary insulation layer, which in the case of a plasticized polymeric vinyl halide jacket causes a rise in power factor of the primary insulation, particularly in high frequency coaxial cables.

The present invention includes the step of baking the formed chlorinated polythene composition, such step being advantageous where a non-tacky product which will not melt at elevated temperatures is desirable. To be effective the baking should be carried out to the point where the chlorinated polythene is at least 50% insoluble in boiling trichloroethylene. Depending somewhat on conditions the duration and severity of the baking treatment will vary considerably. In general, the baking or curing step should be carried out between 230° F. and 400° F. for a period of 1 to 10 hours, it being appreciated that a shorter baking period will be required where a temperature at the upper end of the range is employed.

The chlorinated polythene compositions of this invention also remain flexible without breaking or cracking at temperatures as low as minus 90° F. The thermoplastic materials used heretofore cannot approach this without sacrifice of other properties such as ageing characteristics.

Probably the most important advantage of these compositions is the fact that they are flexible, thermally stable and can be extruded smoothly from the melt without the use of plasticizers. The flexible compositions used heretofore, e. g. plasticized polyvinyl chloride, polyvinyl chloride-acetate copolymer, ethyl cellulose and cellulose acetate, require the use of plasticizers. These plasticized compositions are objectionable in that the plasticizers may mark or attack furniture finishes; for example, women's handbags made of plasticized polyvinyl chloride frequently mark a mahogany varnished table. The compositions of this invention may be injection or compression molded, extruded or calendered into sheeting or used in melt form for various coating applications with or without the use of solvent. They may be used for the fabrication of belts, suspenders, yarns, monofilaments and rattan. In thin sheet form they are useful for the manufacture of shower curtains, raincoats, umbrellas, aprons, baby pants, food wrapping, garment bags and food bowl covers. In the form of thicker sheeting these compositions may be used for making tobacco pouches, wallets, handbags, luggage covering, furniture upholstery, floor and wall covering and lampshades.

As many apparently widely different embodiments of this invention may be made without departing from the spirit and scope thereof, it is to be understood that the invention is not limited to the specific embodiments thereof except as defined in the appended claims.

We claim:
1. A composition essentially comprising chlorinated solid polythene and, as a combined stabilizer and lubricant therefor, a mixture of, by weight of said chlorinated polythene, 0.25%–50.0% of litharge and 1.0%–15.0% of a hydrocarbon wax, said wax consisting of at least 50%, by weight, of a microcrystalline hydrocarbon wax.

2. A composition essentially comprising chlorinated solid polythene and, as a combined stabilizer and lubricant therefor, a mixture of, by weight of said chlorinated polythene, 0.25%–50.0% of litharge, 1.0%–15.0% of a hydrocarbon wax, and 0.25%–4.0% of a metal salt of a long chain fatty acid having from 16 to 20 carbon atoms, inclusive, other than an iron salt, said wax consisting of at least 50%, by weight, of a microcrystalline hydrocarbon wax.

3. A composition essentially comprising chlorinated solid polythene and, as a combined stabilizer and lubricant therefor, a mixture of, by weight of said chlorinated polythene, 0.25%–4.0% of litharge and 1.0%–15.0% of a hydrocarbon wax, said wax consisting of at least 50%, by weight, of a microcrystalline hydrocarbon wax.

4. A composition essentially comprising chlorinated solid polythene containing 25%–35% chlorine, and, as a combined stabilizer and lubricant therefor, a mixture of, by weight of said chlorinated polythene, 0.25%–4.0%, of litharge and 1.0%–15.0% of a hydrocarbon wax, said wax consisting of at least 50%, by weight, of a microcrystalline hydrocarbon wax.

5. A composition essentially comprising chlorinated solid polythene and, as a combined stabilizer and lubricant therefor, a mixture of, by weight of said chlorinated polythene, 0.25%–4.0% of litharge and 1.0%–15.0% of a microcrystalline hydrocarbon wax.

6. A composition essentially comprising chlorinated solid polythene and, as a combined stabilizer and lubricant therefor, a mixture of, by weight of said chlorinated polythene, 0.25%–4.0% of litharge, 1.0%–15.0% of a hydrocarbon wax, and 0.25%–4.0% of a metal salt of a long chain fatty acid having from 16 to 20 carbon atoms, inclusive other than an iron salt, said wax consisting of at least 50%, by weight, of a microcrystalline wax.

7. A composition essentially comprising chlorinated solid polythene containing 25%–35% chlorine, and, as a combined stabilizer and lubricant therefor, a mixture of by weight of said chlorinated polythene, 0.25%–4.0%, of litharge, 1.0%–15.0% of a hydrocarbon wax, and 0.25%–4.0% of a metal salt of a long chain fatty acid having from 16 to 20 carbon atoms, inclusive other than an iron salt, said wax consisting of at least 50%, by weight, of a microcrystalline hydrocarbon wax.

8. A composition essentially comprising chlorinated solid polythene and, as a combined stabilizer and lubricant therefor, a mixture of, by weight of said chlorinated polythene, 0.25%–4.0% of litharge, 1.0%–15.0% of a hydrocarbon wax, and 0.25%–4.0% of zinc stearate, said wax consisting of at least 50%, by weight, of a microcrystalline hydrocarbon wax.

9. A composition essentially comprising chlorinated solid polythene containing 25%–35% chlorine, and, as a combined stabilizer and lubricant therefor, a mixture of, by weight of said chlorinated polythene, 0.25%–4.0%, of litharge and 3.0%–6.0% of a hydrocarbon wax, said wax consisting of at least 50%, by weight, of a microcrystalline hydrocarbon wax.

10. A composition essentially comprising chlorinated solid polythene containing 27%–30% chlorine, and, as a combined stabilizer and lubricant therefor, a mixture of by weight of said chlorinated polythene, 0.25%–4.0%, of litharge and 3.0%–6.0% of a microcrystalline wax having a melting point between 150° F. and 200° F.

11. A composition essentially comprising chlorinated solid polythene containing 27%–30% chlorine, and, as a combined stabilizer and lubricant therefor, a mixture of by weight of said chlorinated polythene, 0.25%–4.0%, of litharge, 3.0%–6.0% of a microcrystalline wax having a melting point between 150° F. and 200° F., and 0.25%–4.0% of a metal salt of a fatty acid having from 16 to 20 carbon atoms, inclusive other than an iron salt.

12. A composition essentially comprising chlorinated solid polythene containing 27%–30% chlorine, and, as a combined stabilizer and lubricant therefor, a mixture of by weight of said chlorinated polythene, 0.25%–4.0%, of litharge, 3.0%–6% of a microcrystalline wax having a melting point between 150° F. and 200° F., and 0.25%–4.0% of zinc stearate.

DAVID ADAMS FLETCHER.
ROBERT SCOTT TAYLOR.

REFERENCES CITED

The following references are of record in the file of this patent:

UNITED STATES PATENTS

| Number | Name | Date |
|---|---|---|
| 2,215,996 | Benton | Sept. 24, 1940 |
| 2,364,410 | Whittaker | Dec. 5, 1944 |
| 2,440,899 | Harvey | May 4, 1948 |